Oct. 22, 1935.  W. A. KOSKEN  2,018,069
CONTINUOUS PROJECTOR WITH SLOW SPEED DEFLECTORS
Original Filed March 17, 1930  5 Sheets-Sheet 1
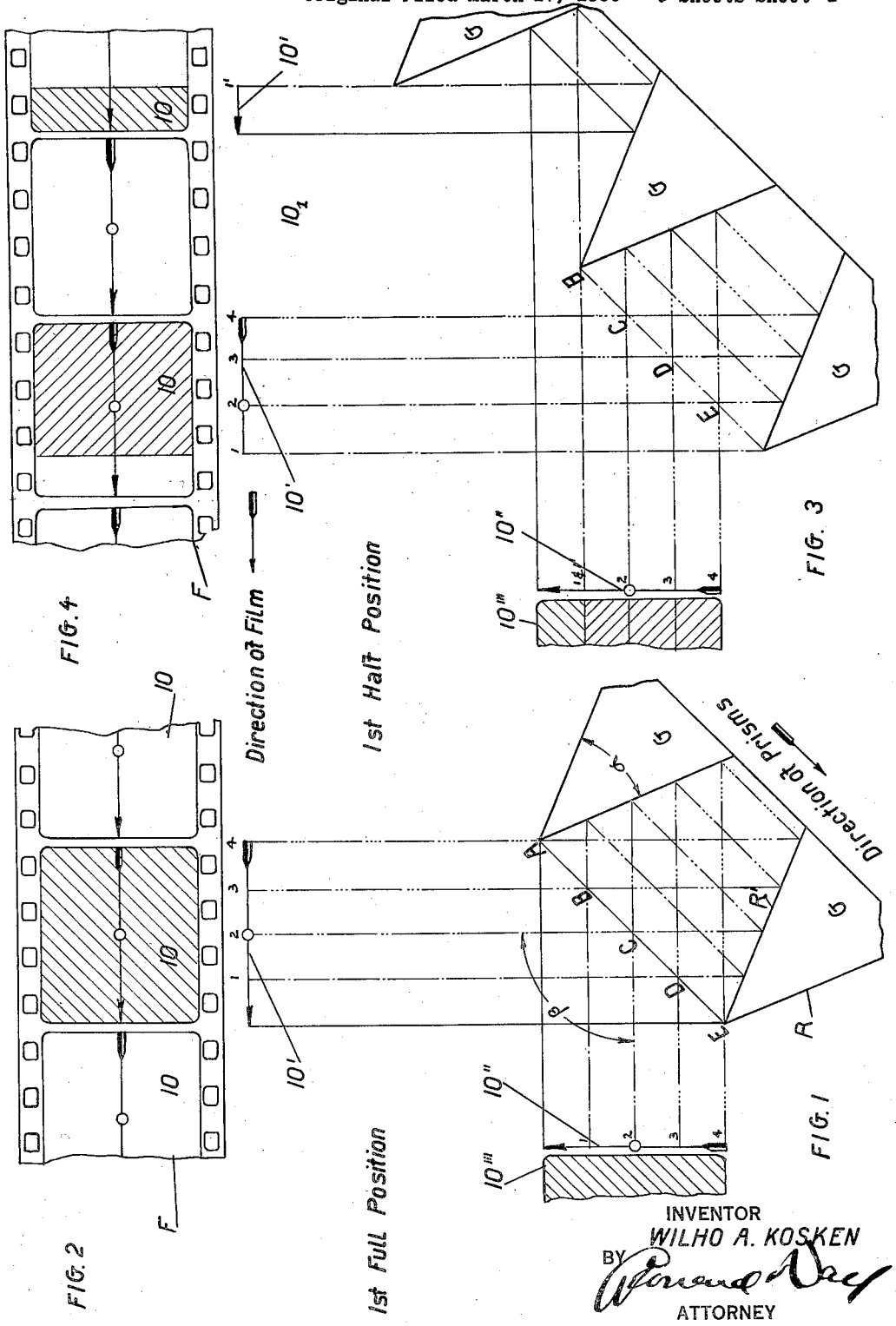

Oct. 22, 1935. W. A. KOSKEN 2,018,069
CONTINUOUS PROJECTOR WITH SLOW SPEED DEFLECTORS
Original Filed March 17, 1930 5 Sheets-Sheet 2
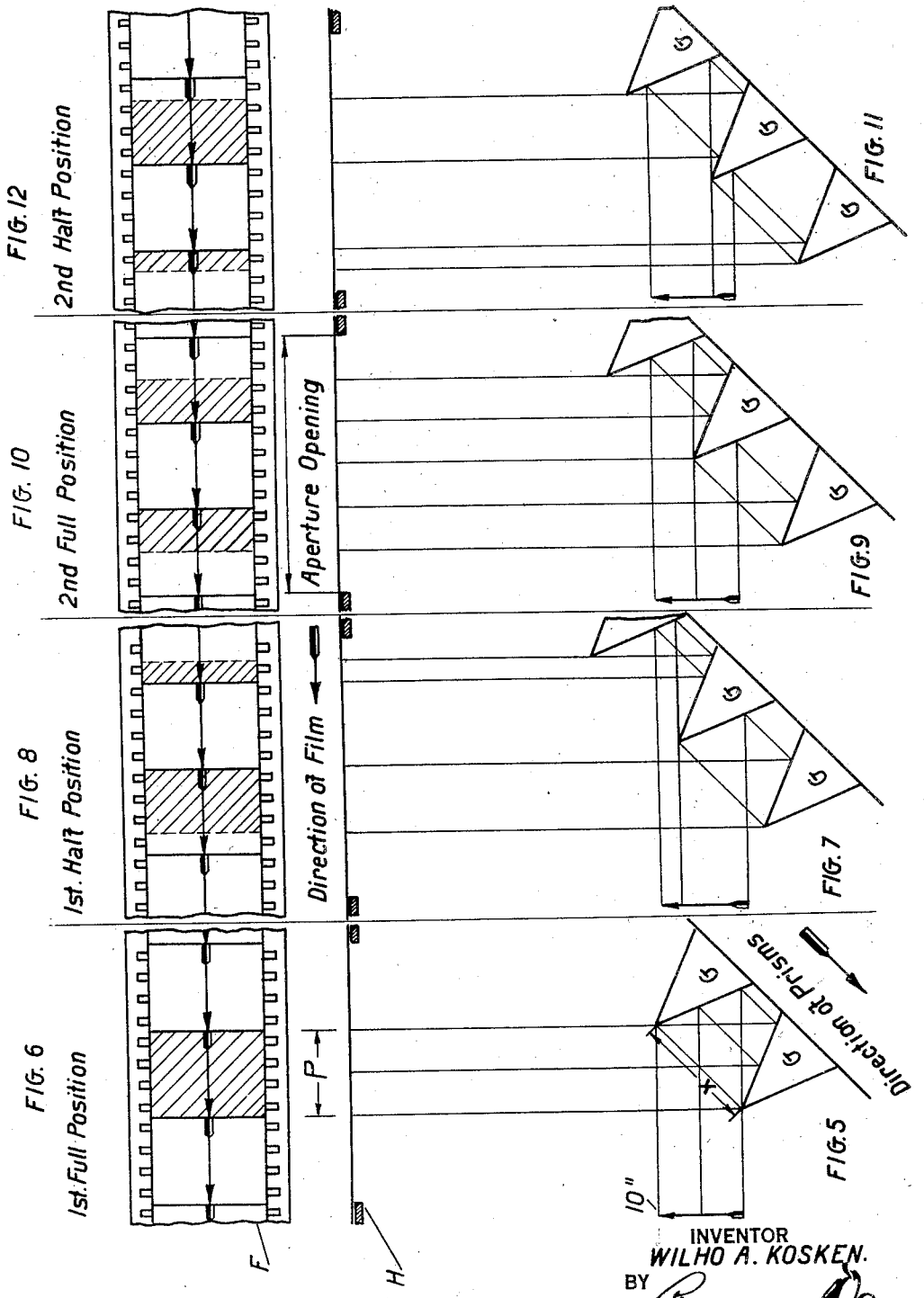
INVENTOR
WILHO A. KOSKEN.
BY
ATTORNEY

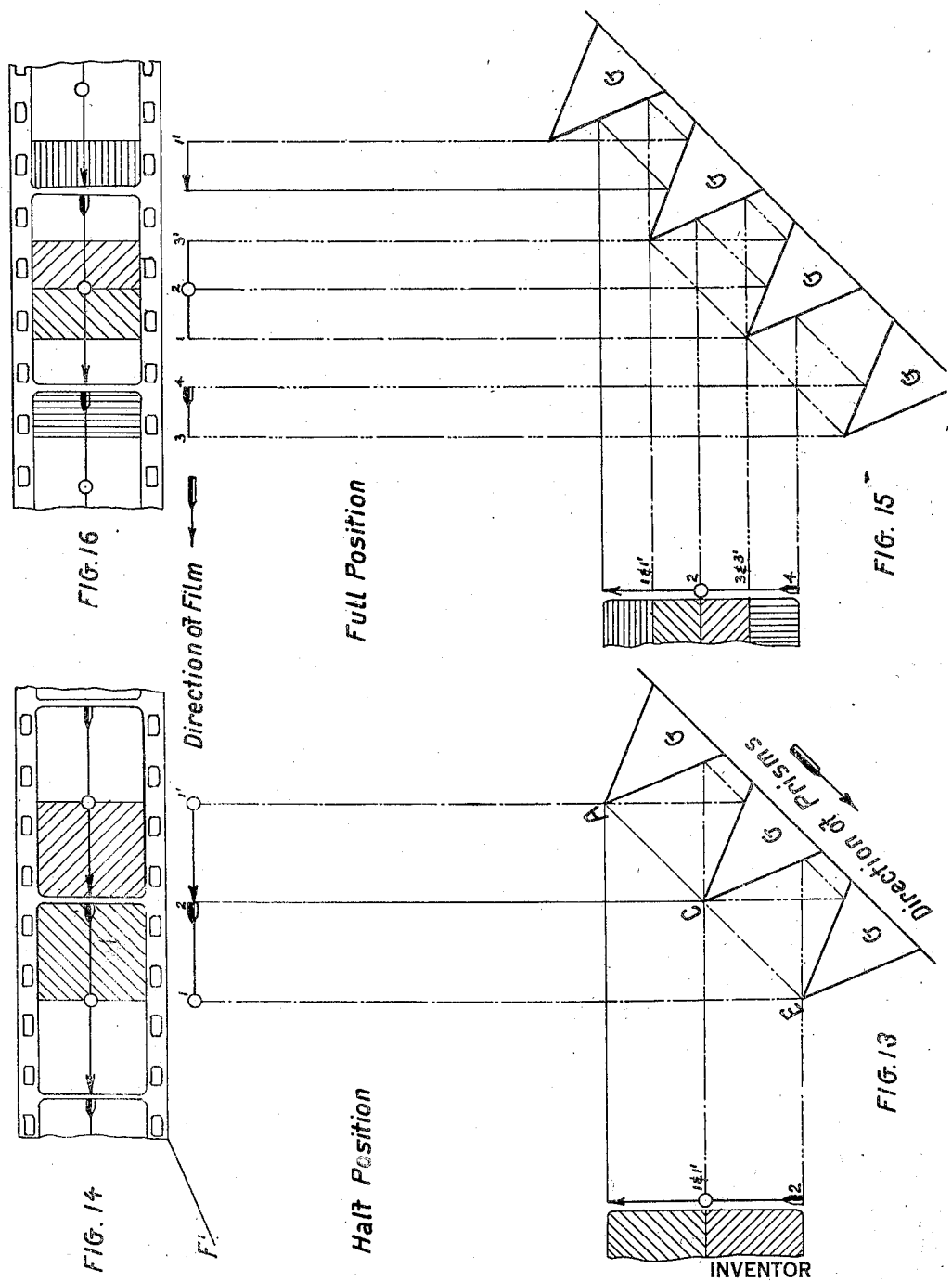

Oct. 22, 1935.     W. A. KOSKEN     2,018,069
CONTINUOUS PROJECTOR WITH SLOW SPEED DEFLECTORS
Original Filed March 17, 1930     5 Sheets-Sheet 4
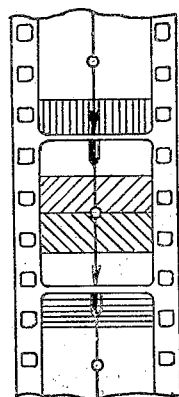
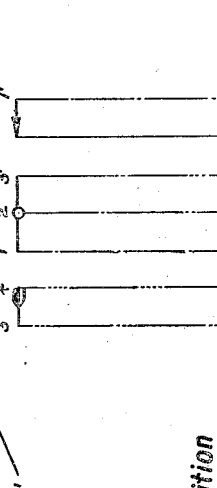
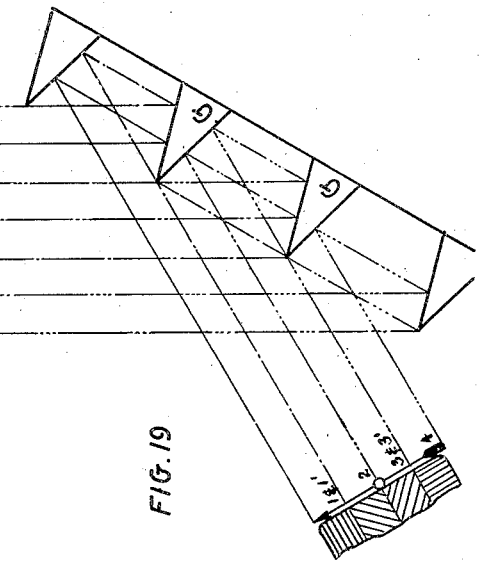
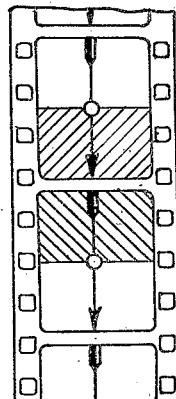
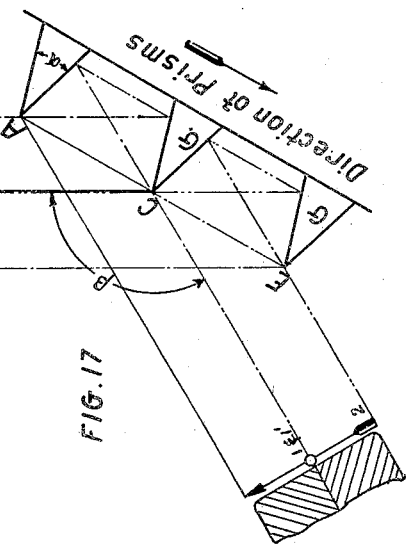
INVENTOR
WILHO A. KOSKEN
BY
ATTORNEY

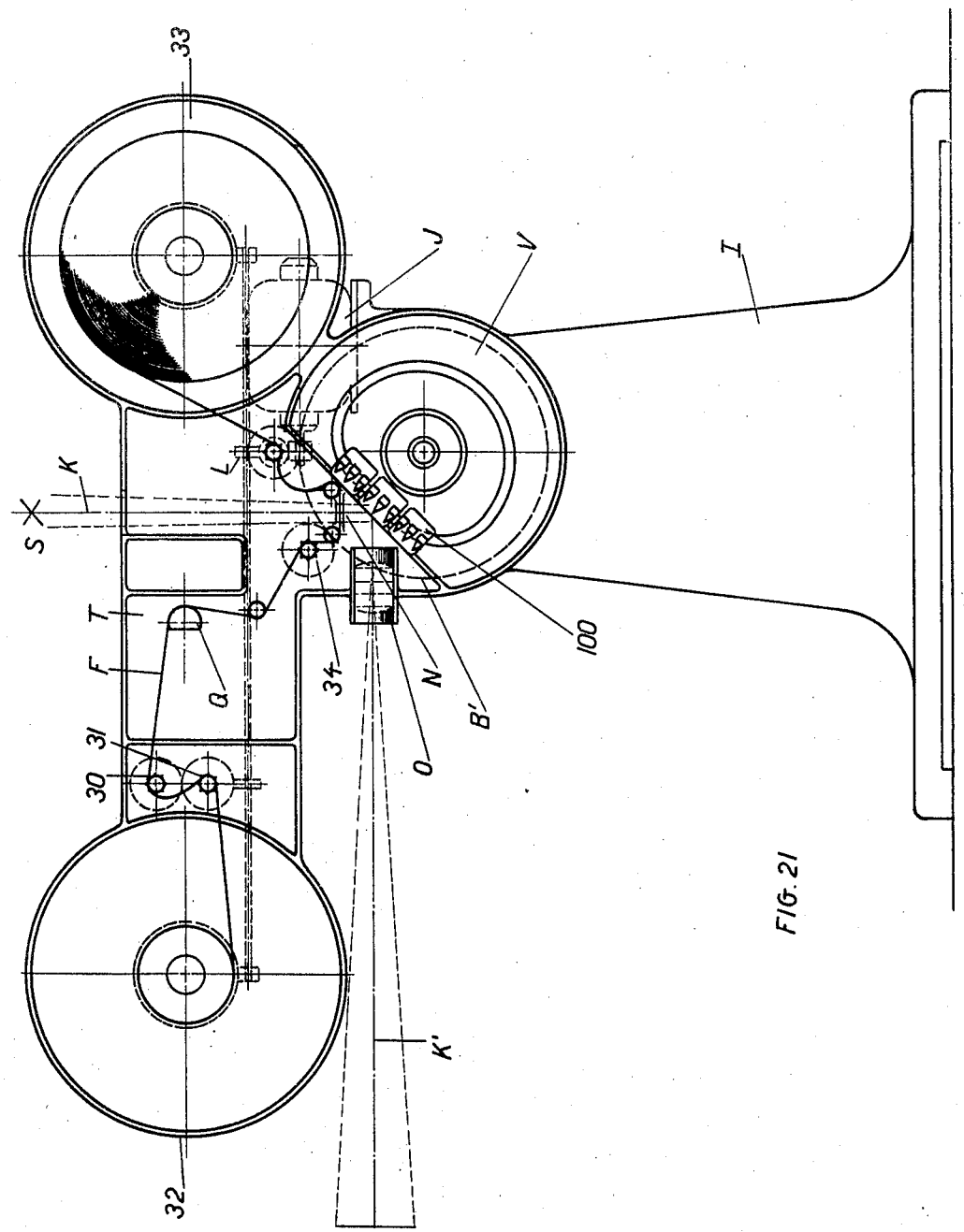

Patented Oct. 22, 1935

2,018,069

UNITED STATES PATENT OFFICE 2,018,069

CONTINUOUS PROJECTOR WITH SLOW SPEED DEFLECTORS

Wilho A. Kosken, New York, N. Y., assignor to Wilho A. Kosken, Inc., a corporation of New York Application March 17, 1930, Serial No. 436,562
Renewed March 1, 1935

8 Claims. (Cl. 88—16.8)

This invention relates to optical apparatus for producing continuous images without any interruption upon a motion picture screen from any standard continuously and uniformly moving transparent film carrying a series of individual images, and to apparatus commonly called a camera for producing a series of images upon a continuously and uniformly moving sensitized film by exposure to natural objects. This application is in part a division and continuation of my application, Serial No. 344,666, filed March 6, 1929, entitled Moving picture apparatus.

More particularly, this invention in its present exposition is directed to an embodiment in the form of a projector although it is expressly my intention that this embodiment be viewed solely as illustrative of my invention which in all of its dually comprehensive features is applicable both to the camera and projector form of apparatus. It is with this understanding that my claims are made.

My invention in its application to a projector is independent of whether the negative film from which the positives are printed and which positives are employed in it, have been taken with the usual intermittent type of camera or with a camera embodying the present invention or another making possible the uniform continuous motion of the sensitized film. However, I prefer the use of a camera in which the sensitized film moves continuously and uniformly largely on account of continuity of action in motion photography.

Within the past decade, in fact within a shorter period, the speed of film in projectors has increased from one foot per second to one and a half feet per second. In consequence, all optical compensating devices must keep up with this higher film speed.

In optical apparatus of this character it has been well understood by inventors, and I well understand the fact that the utmost precision and freedom from vibration must be achieved for all the functioning parts in optical apparatus of this character, and particularly for the moving parts. Heretofore, in compensating optical apparatus of the character involved herein, no one has achieved a speed of motion for the compensating deflectors less than the speed of motion of the continuously uniformly moving film. If the art, therefore, is to be limited to apparatus in which the deflectors must move for their minimum speed at least at the speed of the film the heretofore mentioned increase of film speed would occasion such an increase in the speed of motion of the deflectors as to introduce objectionable mechanical difficulties. Roughly, it may be stated that the difficulties from motion of a mass-possessing part increase not merely in proportion to the increase in speed but more nearly in proportion to the square and to the cube of the speed.

An important object of my present invention is the coordination of parts including optical deflectors moving at speeds less than the speed of the film carrying the images which are to be projected.

A further object of my invention is to coordinate and combine means for moving an image carrying film continuously and uniformly in a plane; a series of deflectors moving continuously and uniformly with straight line motion throughout the field of optical functioning to reproduce a continuous projected image without other optically compensating mechanism.

A still further object of my invention is to produce optically compensating apparatus comprising a continuously uniformly moving film or the means for so moving it with a straight line moving series of deflectors and a projector lens system in which the direction of motion of the film and of the deflectors lie in the same plane.

Stated differently, it is an objective of my invention to produce optically compensating apparatus in which a series of deflectors have straight line motion in a plane common to the light beam axis and the lens axis.

A further object of my invention is to improve and simplify projectors in cameras of the optically compensating type and providing for continuously and uniformly moving film.

A further object of my invention is to produce a coordination of means, the functioning relationship of which are obedient to a simple law and thereby can facilitate the designing of such an apparatus to meet various arbitrary requirements as to the angular relationship between the light beam axis and the lens axis.

The above and further objects of the invention will be pointed out more particularly in the accompanying claims which are directed to illustrative embodiments of the invention described in the following specification in connection with the accompanying drawings.

In the drawings, Fig. 1 is a diagrammatic view showing the formation of the deflectors and the relation of their movement relatively to the images, the light beam axis and the lens axis for full position, and a $\beta$ (beta) angle of 90°;

Fig. 2 is a plan view of a portion of the image bearing film adapted to function in connection with the showing in Fig. 1;

Fig. 3 is a view similar to Fig. 1 for the first half position;

Fig. 4 illustrates in plan the image bearing film for Fig. 3;

Figs. 5 and 6 correspond to Figs. 1 and 2 but show a modification in which the light aperture opening is that for three images;

Figs. 7 and 8 correspond to Figs. 3 and 4 but show the modification in which the light aperture is that for three images;

Figs. 9 and 10 correspond to Figs. 5 and 6 but show the second full position;

Figs. 11 and 12 correspond to Figs. 7 and 8 but show the second half positions;

Figs. 13 and 14 correspond to Figs. 5 and 6 except that three deflectors are involved and the lens is of a size to project two images at a time;

Figs. 15 and 16 show full position for the construction shown in half position in Figs. 13 and 14.

In all of the Figures 1, 3, 5, 7, 9, 11, 13, and 15, the angle β (beta) between the light beam axis and the lens axis is 90° while the angle α (alpha), which is the angle between adjacent reflector surfaces, is 45°.

Figs. 17 and 18 show a diagrammatic representation for half position of apparatus in which the angle β (beta) is 120° and the angle α (alpha) is 30°. This represents the practical limit for the size of angle β (beta).

Figs. 19 and 20 are diagrams corresponding to Figs. 17 and 18 but showing full position.

Fig. 21 is a side elevation of a preferred form of projector capable of embodying any one of the diagrammatic representations shown in Figs. 1 to 20 and actually illustrated as embodying construction capable of functioning in accordance with diagrams 1 to 16 inclusive.

The formula controlling the angles α (alpha) and β (beta) is:

$$\beta \text{ (beta)} = 180° - 2\alpha \text{ (alpha)}$$

The bisector of α (alpha) must be parallel to the bisector of β (beta).

From the above, α (alpha) or β (beta) being within the respective limits of 30° to 60° and 120° to 60°, given either α (alpha) or β (beta), the remaining angle may be calculated with readiness.

The travel of the film is continuous and uniform in motion. The functioning travel as an optical compensator of each deflector unit is also continuous and uniform in straight line motion. Any mechanical movement suitable for effecting this straight line motion may be employed, although I have shown in Fig. 21 the mechanical movement of my own design and previously claimed and described in my copending application Serial No. 403,491, filed October 30, 1929, Patent 1,903,820. There must be a definite relation between the speed of the functioning travel of the deflector units and the linear speed of the portion of the film functioning in the projection of the image light beam.

When the light beam axis and the lens axis are at right angles and P is the pitch of the film (height of one picture), then the pitch of the deflector units (the distance A to E in Fig. 1 or X in Fig. 5) equals $$\sqrt{2}P$$

i. e., $$X = \sqrt{2}P$$

The motion for the deflector units, however, is only one-half of the deflector pitch, by which is meant, the film travels the distance P while the deflector units travel the distance $$\frac{\sqrt{2}P}{2}$$

For other angles than the 90° and 45° embodiment, relative speeds may be calculated in accordance with the formula.

$$M = \frac{P}{2 \sin \alpha}$$

when M equals the deflector motion and P equals the pitch of the film or the linear extent of a frame.

In some of my previously filed applications, my deflectors have moved so as to cut or pass through the plane defined by the light beam axis and the lens axis with a somewhat diagonal motion so that there was only a component of their linear motion in this plane. This construction required that the reflecting faces be of considerable lateral extent whereas my present construction and combination moves the deflector units in a functioning path in this plane and requires for their lateral extent an extent only sufficient to accord with and accommodate the width of the frame or film image to be projected. In this my present construction I bring each two adjacent reflecting surfaces to an edge whereby the compensating function passes immediately from one reflecting surface to another, not directly from one reflecting surface to the next reflecting surface which forms the heretofore mentioned edge, but from the reflecting surface of one deflector to the corresponding reflecting surface of the next deflector and then by reflection to the reflecting surface from the heretofore mentioned edge.

Again, in my present construction another advantage exists. The only functioning motion imparted to the deflectors is the necessary optically compensating motion itself and not an arbitrary motion such as that described in my heretofore mentioned pending application, only a component of which motion functions in the optically compensating work. It is this novel edged termination construction combined with solely a compensating motion for the deflectors that makes possible both the small size for the deflectors of my present invention and the slow speed necessary to be imparted thereto for the purpose of effecting optical compensation in a projector of this character.

My present construction also lends itself to a novel advantageous functioning heretofore impracticable, namely, I am now able, with a series of deflectors of practical small number, practical dimensions and practical straight line motion, to develop with faithful compensation several images from the moving film at the same time, each projected as a still image in its proper relative position. Although I believe that the art of optical compensation is now well understood, it may be well to express the character of the image production in its projection by means of optically compensating mechanism such as that disclosed herein. The projected images are as if they were unrolled or unfolded in their projection, each actual image unrolling or unfolding itself in the field of projection dependent upon the rate of continuous uniform motion of the film bearing the image. This functioning results in a constantly varying extent of the same image which is actually brought into visibility in projection. This does not mean that the image moves transversely across the projection field, but merely as heretofore expressed, more and more of it is unrolled or unfolded or becomes a part of the projection. This, of course, has no deleterious effect upon the ocular impression when the projected images are viewed on the screen because the speed of changing from one image depicting one position of a moving object and changed into the next image depicting an increment of motion in the object is so rapid as to cause the usual retina blending giving the semblance of motion, and the fact that the blending is accomplished between partial images at these same speeds in no way destroys the functioning of the human retina.

In connection with this new advantage of unfolding a plurality of images in their respective proper positions at the same time, new uses for an optically compensating projector are opened, one of which, a ready application to color photography, I have described and claimed in a copending application.

Describing the diagrams now more in detail, and with particular reference to Figs. 1 to 4 inclusive, the film F bears images 10 in a spaced sequence or series in accordance with common practice and as is well known, usually representing each an increment change in position if the objects portrayed were moving objects. In these diagrams, the shaded portions of the images are the only portions opticaly compensated and being projected to complete the visible projected image.

In Fig. 1 the image to be projected is indicated by the arrow 10', and in the position of the deflectors G is projected in its entirety. It is indicated by the arrow 10'' and by the developed shaded portion 10''' which is assumed to be at the focal point of the projecting lens system. In connection with the optics of this apparatus, it should be noted that the total light beam distance as from point 2 on arrow 10' to the point 2 on 10'' is arbitrary so far as the optically compensating function is concerned but is, nevertheless, fixed relatively to the projecting lens system and must be the focal distance from image 10' to the projecting lens system. Obviously, where this distance may be arbitrarily taken and the lens system designed to accord with it, or if the lens system is arbitrarily taken, this distance must accord with the requirements of the arbitrarily selected lens system.

In Figs. 3 and 4, the unfolding functioning of the apparatus is made clear. In these figures the film F has progressed an increment of movement measured by the shortening of the shaded portion of the first image 10 and by the new shaded portion 10 of the second following image. We thus find in this diagram that the arrow 10' is broken up, only a portion of it now representing the first image while the remaining portion of it represents a fraction of the second following image. These two fractions, however, are projected or reflected to the focus as complete images 10'' and 10'''. In fact, however, this visible image 10'' is three-quarters of one image plus one-quarter of another image, the edge to edge matching, however, corresponding with the ending and beginning of matching portions of similar images which may be identical for still photography but which are different by an increment of motion in motion picture photography. Figs. 3 and 4, therefore, bring out the fact that three deflectors are involved in the projection shown in Figs. 3 and 4 including a total of four reflecting surfaces. It is also obvious that the deflectors are positioned so that there is a projection of the intermediate image 10₁ shown in Fig. 4 although the light ray lines are not drawn for this image.

The diagrams of Figs. 5 to 12 inclusive are an amplification of what has been shown and described in connection with the diagrams 1 to 4 inclusive but indicate in addition a gate opening H through which either three complete images or fractions thereof totalling three complete images may be under projection at the same time although but one image is actually shown in its projection.

Figs. 13 to 16 inclusive indicate diagrammatically the functioning of my system when the pitch of my deflectors is halved with respect to the image pitch on a film F'.

Figs. 17 to 20 inclusive show the same arrangement and functioning as that illustrated in Figs. 13 to 16 inclusive for another angle of β (beta).

In Fig. 21 I have shown a complete projector embodying my present invention. In this apparatus a suitable frame I provides the support and framing for the different parts, all the moving parts of which are driven preferably from a single motor J which is worm to worm gear connected to drive the gear B' corresponding to the gear B of my prism carrier described in my copending application above identified. In my above identified prism carrier, the prisms optically face normal to the plane of the gear B' whereas in this embodiment they face in a direction parallel to the plane of the gear B and in a plane corresponding to the axes K and K' but respectively to the light beam axis and the lens axis. The deflectors G are shown mounted in plural groups, three in the present embodiment for each carrier block 100 corresponding to the carriers 10 in my copending application. In this embodiment all the deflectors are shown wedge-shaped and bearing each two symmetrical surface reflectors R and R'.

A suitable gear and shaft train L intergears the film driving sprockets 30, 31 and the winding and unwinding reels 32 and 33 while the sprocket 34 is shown driven from the gear B'. Any suitable source for a projector light beam is indicated at S. N is the film gate and O the projector lens system. The apparatus is designed to accommodate sound projection which may be accommodated in the sound head T where the film passes over the sound gate Q. It is to be understood that the gearing is designed relatively to the speed of the motor J to impart to the film F the desired rate of speed per second and through the medium of the mechanical movement V to impart a functioning straight line movement to the deflectors in accordance with the formulas given herein and by means of functioning parts as described in my heretofore mentioned copending application.

What I claim and desire to secure by United States Letters Patent is:

1. In an optically compensating apparatus for continuous uniform motion of a strip bearing a series of images, means for producing a light beam transverse to the path of said strip; a projector lens system arranged with its axis in the plane defined by the direction of travel of said strip and the axis of said light beam, but intercepting the axis of said light beam; a single series of similar deflectors, having pairs of symmetrically inclined reflectors throughout the operative travel of said deflectors functioning to effect double reflection from one reflector to a second reflector and thence to the lens system, always along paths of equal focal length; means for imparting traveling movement to said deflectors functionally synchronized with said strip in an endless closed path, a portion of which is straight and lies in the plane defined by the travel of said strip, said light beam and the axis of said projector lens system.

2. In optically compensating apparatus for continuously and uniformly moving image bearing film through its optical functioning travel, a series of movable deflectors, having pairs of symmetrically inclined reflectors throughout the operative travel of said deflectors functioning to effect double reflection from one reflector to a second reflector and thence to the lens system always along paths of equal focal length; combined operating and guiding means for moving said deflectors continuously in an endless closed path, a portion of which is straight and lies in the plane defined by the path of travel of said film and a line at right angles thereto; means for producing a light beam through the path of travel of said film across the straight line path of said deflectors; a projector lens system, the axis of which intercepts the axis of said light beam; and means for synchronously moving said image bearing film and said deflectors each at a uniform speed of linear travel, but with the speed of the deflectors less than that of said film.

3. In optically compensating apparatus for continuously and uniformly moving image bearing film, a series of compensating deflectors each providing a pair of reflecting surfaces with each surface of said pair terminating optically in the same edge line in the locality closest to the functioning travel for said image-bearing film; and means for causing said deflectors to move in their compensating functioning movement in a straight path in the same plane as the path of functioning travel for said image bearing film.

4. In a motion picture projector for continuously and uniformly moving film, a single series of deflectors having pairs of symmetrically inclined reflecting surfaces throughout the operative travel of said deflectors functioning to effect double reflection from one reflecting surface to a second reflecting surface and thence to the lens system always along paths of equal focal length and each said reflecting surface having substantially a width equal to the width of the film image to be projected; means for producing and projecting a light beam without interruption through said film in cooperation with said reflecting surfaces to a projection screen; and means for imparting a straight line functioning motion to said deflectors in the same plane as that of the path of travel of said uniformly moving film at its functioning part and forming a part of an endless closed path of travel.

5. In optically compensating apparatus for continuously and uniformly moving image-bearing film, a series of deflectors each having symmetrically positioned inclined reflecting surfaces; a source for projecting a beam of light at right angles across the functioning travel of said image-bearing film; a projection lens system the axis of which lies in the plane defined by the functioning path of travel of said film and the axis of said projection beam; means for positioning and moving said deflectors with a straight line movement in said plane and so as to intercept said projection beam to effect a double reflection by said deflectors, the direction of which between two deflectors is opposite to the direction of motion of said deflectors whereby said deflectors may be functionally moving at a slower rate of speed than that of said image-bearing film.

6. In the motion picture art, the method of securing substantially constant focal length in an optical machine for compensating a continuously traveling image-bearing film comprising providing a series of pairs of reflecting surfaces, each pair of which are inclined symmetrically to their functioning path of travel and form the angle $\alpha$ therebetween; causing said reflecting surfaces to travel in a straight line path at a uniform rate of speed across the axis of projection through the images of said film so that said speed is, relatively to the speed of travel of said film, so that the $$\frac{\text{Pitch of film}}{2 \sin \alpha}$$

is a measure of the speed of said reflecting surfaces.

7. The method as defined in claim 6 and characterized by the fact that the axis of the projection beam through the film makes an angle $\beta$ with the axis of the projection beam such that $\beta = 180° - 2\alpha$.

8. In an optical system capable of functioning upon standard motion picture film wherein the consecutive frames are directly adjacent to each other with their side edges parallel with the length of the film, the combination of a film gate having an aperture corresponding in shape and position to said standard frame; an objective lens system with its axis intersecting the axis of said film gate; means for constantly moving said film through said gate in the plane defined by said axes; a plurality of pairs of deflectors for directing light between said gate and said objective lens system, the deflectors of each pair when in functioning range being fixed relatively to each other and one directing light to the other, the angles between the light beam and each of two functioning deflectors being unequal; means to guide said deflectors in an endless path in one plane with their functioning surfaces at right angles in the plane of said axes and having a light functioning straight part and with the distance between the film gate, reflectors, and objective lens system along parallel paths constant and equal; means for constantly moving said pairs of deflectors in said endless path and through said light functioning straight part with a movement in synchronism with said film and at uniform speed and with the angles between deflectors and light beams and the component of the travel of said pairs of deflectors in said straight part in the plane of said axes being proportioned to compensate for the travel of the film and maintain a light path of constant length between said gate and said objective lens system.

WILHO A. KOSKEN.